United States Patent [19]
Swoboda et al.

[11] Patent Number: 6,038,622
[45] Date of Patent: Mar. 14, 2000

[54] PERIPHERAL ACCESS WITH SYNCHRONIZATION FEATURE

[75] Inventors: Gary L. Swoboda, Sugar Land, Tex.; Iain Robertson, Cople Village, United Kingdom

[73] Assignee: Texas Instruments Incorporated, Dallas, Tex.

[21] Appl. No.: 08/129,522

[22] Filed: Sep. 29, 1993

[51] Int. Cl.[7] .................................................. G06F 1/04
[52] U.S. Cl. ............................................................ 710/61
[58] Field of Search ................................... 395/550, 427

[56] References Cited

U.S. PATENT DOCUMENTS

| | | | |
|---|---|---|---|
| 4,827,476 | 5/1989 | Garcia ........................................ | 371/25 |
| 4,884,234 | 11/1989 | Keys et al. ................................ | 364/900 |
| 4,965,722 | 10/1990 | Tokuume .................................. | 364/200 |
| 5,033,027 | 7/1991 | Amin ........................................ | 365/222 |
| 5,201,036 | 4/1993 | Yoshimatsu ............................... | 395/325 |
| 5,208,779 | 5/1993 | Walther et al. .......................... | 365/222 |
| 5,239,639 | 8/1993 | Fischer et al. ........................... | 395/425 |
| 5,265,053 | 11/1993 | Naradone et al. ....................... | 365/193 |
| 5,276,858 | 1/1994 | Oak et al. ................................ | 395/550 |
| 5,335,201 | 8/1994 | Walter et al. ............................ | 365/222 |
| 5,345,574 | 9/1994 | Sakurada et al. ........................ | 395/425 |

*Primary Examiner*—James P. Trammell
*Attorney, Agent, or Firm*—Christopher L. Maginniss; W. James Brady, III; Richard L. Donaldson

[57] ABSTRACT

A data processing apparatus includes control circuitry (15, 73) connectable to a peripheral device (17) for performing an access of the peripheral device, and data processing circuitry (13) connected to the control circuitry. The control circuitry includes synchronizing circuitry (29, 77) for synchronizing the control circuitry with the data processing circuitry after completion of the peripheral access.

27 Claims, 5 Drawing Sheets

PERIPHERAL ACCESS WITH SYNCHRONIZATION FEATURE

FIELD OF THE INVENTION

The present invention relates generally to techniques for accessing peripheral devices and, more particularly, to a peripheral access technique with a synchronization feature which synchronizes between independently clocked components of a peripheral access apparatus.

BACKGROUND OF THE INVENTION

Data processing devices in conventional data processing systems often access an external peripheral device memory in the system, for example a memory. With external memory devices such as DRAMs, memory cycles often require more than one clock cycle for completion, and such memory cycles should preferably not be interrupted. This presents problems in some circumstances, such as when the data processing system is being operated in an emulation mode. For example, although the memory cycle should not be stepped through with an intermittent emulation step clock, it is nevertheless advantageous to use the step clock for stepping the data processing device through its operations. However, if the data processing device is being intermittently stepped by the step clock while a memory cycle is being performed using the normal system clock, then a synchronization problem can occur at the interface between the data processing device and the external memory.

It is therefore desirable to provide a data processing apparatus capable of compensating for synchronization problems of the type described above.

A data processing apparatus according to the present invention includes control circuitry connectable to a peripheral device for executing an access of the peripheral device, and data processing circuitry connected to the control circuitry for requesting the peripheral access. The control circuitry includes synchronizing circuitry for synchronizing the control circuitry with the data processing circuitry after completion of the peripheral access.

DETAILED DESCRIPTION

Figure 1:
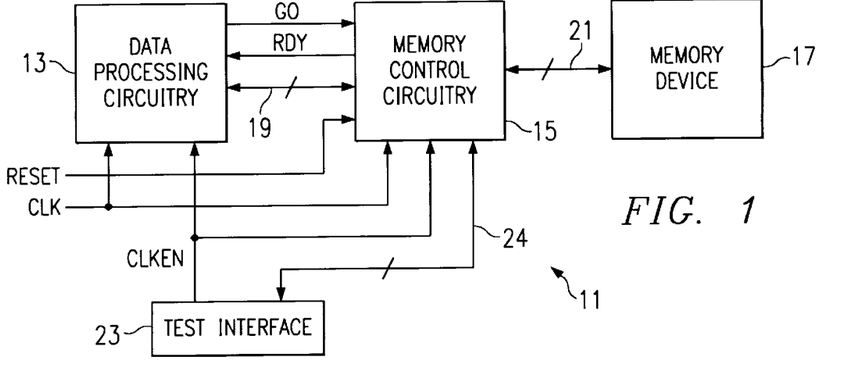
FIG. 1 is a block diagram of a data processing system including the present invention.

FIG. 1 illustrates a data processing system including a data processing apparatus 11 having data processing circuitry 13 and memory control circuitry 15. The memory control circuitry 15 functions as an interface between the processing circuitry 13 and an external memory device 17. The data processing circuitry 13 provides a GO command to the memory control circuitry 15 in order to initiate a memory access. The address of the desired memory location is communicated from data processing circuitry 13 to memory control circuitry 15 via bus 19 which includes both address and data lines. The memory control circuitry 15 normally performs a memory access, or memory cycle, in response to the GO command from data processing circuitry 13. The memory access is accomplished via bus 21 connecting memory control circuitry 15 to the external memory device 17. The bus 21 includes address, data and control lines. When the memory control circuitry 15 completes the memory access, a ready signal RDY is issued from the memory control circuitry 15 to the data processing circuitry 13, indicating that the memory cycle has been completed. The external memory device 17 may be, for example, a dynamic random access memory (DRAM).

The data processing apparatus 11 is also provided with a test interface 23 which is externally controllable by, for example, a test controller (not shown). The test interface 23 communicates with memory control circuitry 15 via bus 24, and is responsive to external control to provide a clock enable signal CLK EN which is used in the data processing apparatus 11. The data processing circuitry 13 is clocked normally when CLK EN is high, and is halted when CLK EN is low. The clock enable signal and the system clock are also input to the memory control circuitry 15, along with a reset signal.

Figure 2:
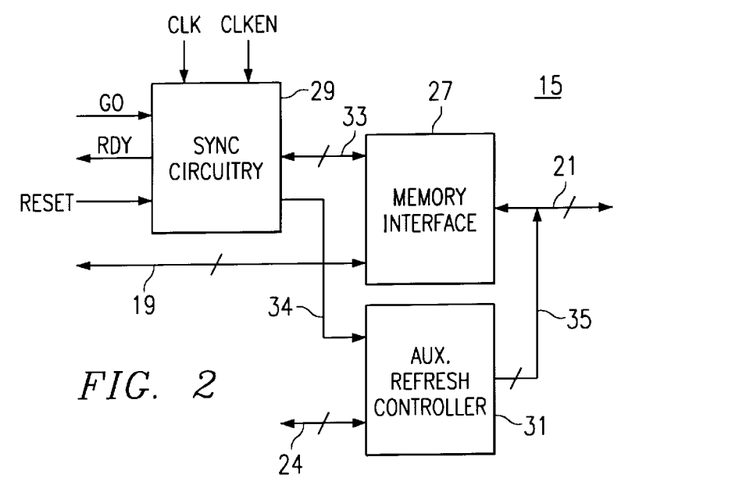
FIG. 2 is a block diagram of the memory control circuitry of FIG. 1.

FIG. 2 illustrates in greater detail the memory control circuitry 15 of FIG. 1. The memory control circuitry 15 includes a memory interface 27 which executes the memory accesses, synchronizing circuitry 29 which synchronizes the operation of the memory interface 27 with the data processing circuitry 13, and an auxiliary refresh controller 31 for providing refresh cycles to the external memory during the time that the memory interface 27 and the data processing circuitry 13 are being synchronized. The synchronizing circuitry 29 receives the reset and clock enable (CLK EN) inputs, the normal system clock input CLK, and the GO command from the data processing circuitry 13. The synchronizing circuitry 29 also provides the ready signal RDY to the data processing circuitry 13. The memory interface 27 is connected to data processing circuitry 13 via bus 19, and is connected to the external memory device 17 via bus 21. The memory interface 27 also communicates with the synchronizing circuitry 29 via a control signal bus 33. A control line 34 from synchronizing circuitry 29 is input to the auxiliary refresh controller 31. The auxiliary refresh controller 31 is connected to the external memory device 17 via busses 35 and 21, and to the test interface 23 via bus 24.

Figure 3:
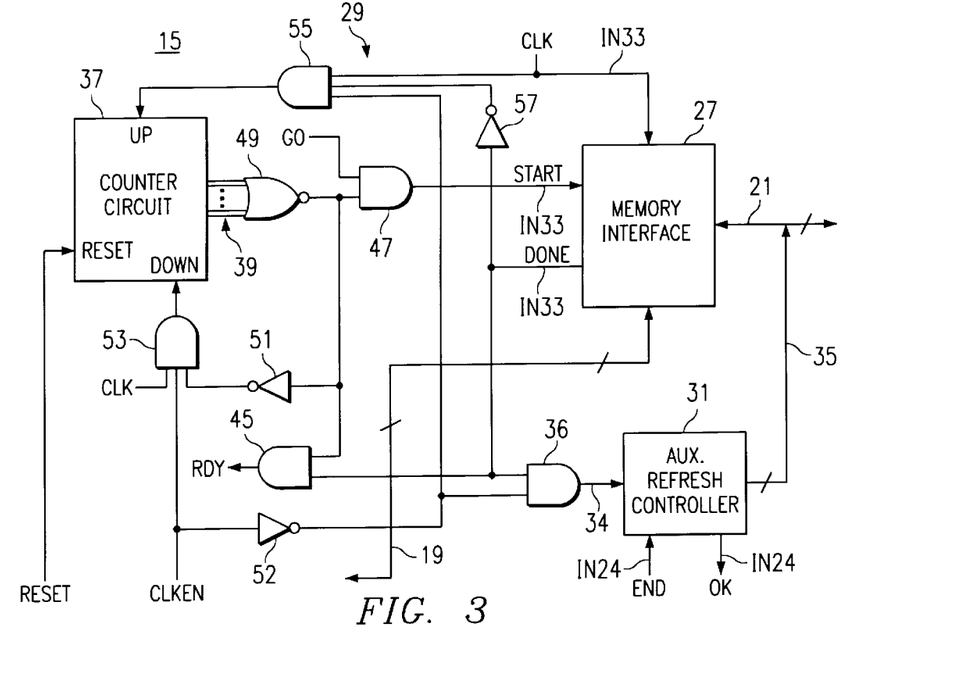
FIG. 3 illustrates one embodiment of the synchronizing circuitry of FIG. 2.

Referring also now to FIG. 3, one exemplary embodiment of the synchronizing circuitry 29 is illustrated in further detail. In the embodiment of FIG. 3, when CLK EN is low, an up/down counter circuit 37 counts upwardly with each clock pulse of the normal system clock CLK during the memory access, thereby recording the number of normal system clock pulses necessary to complete the memory access after data processing circuitry 13 has been disabled. When the counter circuit 37 has a non-zero output and CLK EN is high, the counter circuit 37 is decremented with each pulse of CLK. This allows the counter circuit 37 to determine when the data processing circuitry 13 has received a number of CLK pulses equal to the number of CLK pulses that were required to complete the memory access data processing circuitry 13 was disabled.

A new GO command cannot be passed through AND gate 47 to the memory interface 27 until the data processing circuitry 13 has been clocked through a number of clock pulses equal to the number of clock pulses which were required to complete the previous memory access after the data processing circuitry 13 was disabled by CLK EN. When this point in time is reached, the machine state of data processing circuitry 13 is the same as it would have been at the end of the memory access had the data processing circuitry 13 been clocked by the normal system clock. Until this condition is reached, the synchronizing circuitry 29 prevents the memory control circuitry 15 from issuing the ready signal RDY to the data processing circuitry 13. Thereafter, when the machine state of data processing circuitry 13 is properly synchronized to the machine state of the memory control circuitry 15, then the synchronizing circuitry 29 permits the memory control circuitry 15 to issue the ready signal to data processing circuitry 13.

Referring again to FIG. 1, the reset signal resets the counter circuit 37 in FIG. 3 so that each output line 39 thereof is cleared to logic zero.

The memory interface 27 of FIG. 3 begins a memory access in response to the START input thereof. The DONE output of memory interface 27 is driven low while a memory access is in progress, and is otherwise held high.

In a step mode of operation, the data processing circuitry 13 of FIG. 1 may be step clocked via the CLK EN line. When the step mode begins, the counter circuit 37 is reset so that its output 39 is all zero. The inputs of NOR gate 49 are connected to counter output 39, and the all zero counter output at 39 thus drives the output of NOR gate 49 high. The output of NOR gate 49 is connected to an input of AND gate 47, an input of AND gate 45, and the input of inverter 51. The output of inverter 51 is connected to an input of AND gate 53. Once the output 39 of counter circuit 37 has been reset to all zeros, the resulting high output of NOR gate 49 qualifies the DONE signal at AND gate 45 and the GO command at AND gate 47 while inhibiting, via AND gate 53 and inverter 51, the down count input to counter circuit 37. Because the DONE output of memory interface 27 is maintained high except during memory accesses, the DONE output inhibits, via inverter 57 and AND gate 55, the up count input to the counter circuit 37, except during memory accesses wherein DONE is low. The CLK EN signal is input to an inverter 52 whose output is connected to an input of AND gate 55. Thus, once the counter circuit 37 is reset, no counting occurs until a memory access cycle begins with CLK EN low (i.e., with CLK disabled in the data processing circuitry 13). The high DONE output, qualified at AND gate 45, drives RDY high, indicating that memory control circuitry 15 is available for a memory access.

Figure 4:
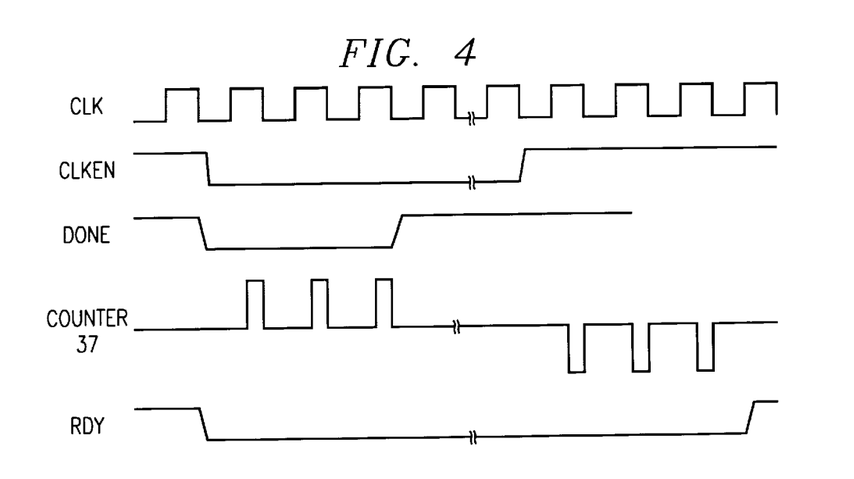
FIG. 4 is a timing diagram which illustrates the operation of the circuitry in FIG. 3.

Referring also now to FIG. 4, if the GO command is issued by data processing circuitry 13 just before CLK EN goes low, then the GO command is applied to the START input of memory interface 27 via AND gate 47. When the GO command is received at the START input of memory interface 27, a memory access cycle begins, and the DONE output of memory interface 27 is driven low. With DONE and CLK EN low, CLK is qualified at AND gate 55, allowing the counter outputs 39 to count up in response to CLK. The low DONE signal drives the ready signal RDY low via AND gate 45.

DONE is held low from commencement of the memory access until completion of the memory access. Thus, the counter circuit 37 counts upwardly upon each clock cycle that occurs while DONE and CLK EN are low, thereby accounting for the number of clock cycles that occurred during the memory access while CLK was disabled in the data processing circuitry 13. In the example of FIG. 4, three clock cycles occur during the memory access. Each upwardly directed pulse in the "counter 37" line of FIG. 4 represents an increment to the counter output 39 in response to a clock pulse of normal system clock CLK applied to the UP input of counter circuit 37. Thus, when DONE is driven high at the end of the memory access cycle, the output 39 of counter 37 has been incremented three times from its initialized state of all zeros. The output of NOR gate 49 is driven low in response to the first increment of the counter circuit 37, because the output 39 is at that time incremented out of its initial all zero state.

When the output of NOR gate 49 goes low, DONE and GO are respectively disqualified at AND gates 45 and 47, and the output of inverter 51 goes high. Because DONE is disqualified at AND gate 45, RDY remains low even after DONE is driven high at the end of the memory access cycle. When DONE goes high, further incrementing of the counter circuit 37 is prohibited via inverter 57 and AND gate 55. When CLK EN goes high again, and with the output of inverter 51 already high, the DOWN input of counter circuit 37 is driven to down count, or decrement, the counter output. The decrementing of counter 37 (shown by downwardly directed pulses in FIG. 4) continues until the output 39 again reaches the all zero state, whereupon the output of NOR gate 49 is driven high to qualify DONE and GO at AND gates 45 and 47, respectively, while inhibiting the DOWN count input of counter circuit 37 via inverter 51 and AND gate 53. With DONE high, RDY goes high, thereby indicating to the data processing circuitry 13 that the memory access has been completed.

As discussed above, after CLK EN goes low, three more pulses of CLK are needed to complete the memory access in the example of FIG. 4. Thus, the counter circuit 37 counts upwardly to three before DONE is driven high to remove CLK from the UP input of counter circuit 37. Although the memory access cycle has in fact already been completed, the ready signal RDY will not be issued to the data processing circuitry 13 until the data processing circuitry 13 reaches the machine state that it would have been in at the end of the memory cycle had the data processing circuitry 13 been clocked by CLK throughout the memory cycle. The desired clocking pattern of data processing circuitry 13 is controlled by CLK EN and may be irregular. However, counter circuit 37 decrements upon each CLK pulse of the sequence. When the number of CLK pulses that the data processing circuitry 13 has received since the GO command equals the number of CLK pulses required to finish the memory access while CLK EN was low, the data processing circuitry 13 has reached the desired machine state, and the output 39 of counter circuit 37 has decremented back down to zero, causing RDY to go high as described above.

The amount of time between the end of a given memory access and the re-enabling of the clocking of data processing circuitry 13 is irregular and indeterminable. Therefore, the auxiliary refresh controller 31 is useful when the external memory device 17 is a dynamic memory device such as a DRAM. The auxiliary refresh controller 31 has an input connected to the output of an AND gate 36 having one input connected to DONE and another input connected to the output of inverter 52. The auxiliary refresh controller is operative while DONE is high and CLK EN is low to provide memory cycles via busses 35 and 21 to keep memory device 17 refreshed. When it is desired to drive CLK EN high again, the test interface 23 issues, via bus 24, an END signal indicating to the auxiliary refresh controller 31 that CLK EN is to be taken high again, so no new refreshes should be started after the current one is completed. Thereafter, when the current refresh is completed, the auxiliary refresh controller 31 issues, via bus 24, an OK signal indicating to the test interface 23 that CLK EN can be driven high again.

Figure 5:
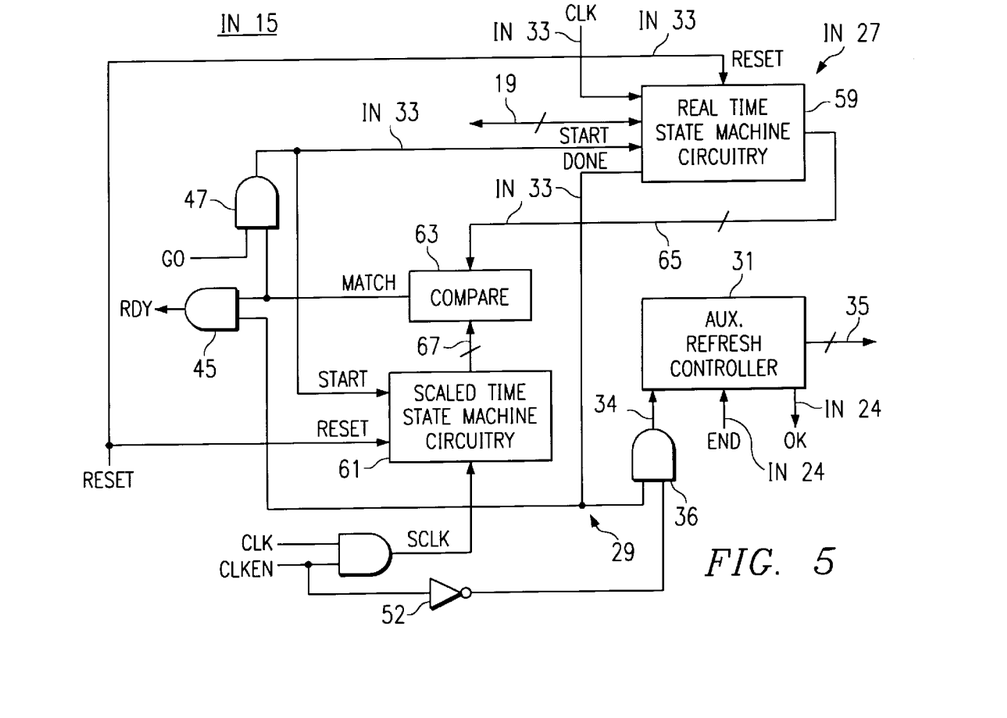
FIG. 5 illustrates another embodiment of the synchronizing circuitry of FIG. 2.

FIG. 5 illustrates another exemplary embodiment of the present invention. Structure in FIG. 5 which is analogous to structure in FIGS. 1–3 has been designated with like reference numerals. In the embodiment of FIG. 5, memory interface 27 is provided with real time state machine circuitry 59 driven by the normal system clock (or real time clock) CLK to control execution of the real time memory access performed by the memory interface 17. The state machine circuitry 59 includes a state machine that responds to activation of a START input by assuming a beginning state during the next pulse of normal system clock CLK, and thereafter progressing through a sequence of states with each successive clock pulse of CLK. This sequence of states controls the memory access operation of the memory interface 27.

In the FIG. 5 embodiment, the synchronizing circuitry 29 includes scaled time state machine circuitry 61 having a state machine which is functionally identical to the state machine in real time state machine circuitry 59 and which operates identically thereto. However, the scaled time state machine circuitry 61 is driven by a scaled time clock SCLK rather than CLK. SCLK is generated by AND gate 62 whose inputs are CLK and CLK EN. Thus, SCLK represents the clock sequence used to drive data processing circuitry 13. When the START input of scaled time state machine circuitry 61 is activated, the state machine thereof assumes the beginning state during the next pulse of SCLK and advances through each state of the sequence with each successive pulse of SCLK. The reset signal of FIG. 1 is connected to respective reset inputs of real time state machine circuitry 59 and scaled time state machine circuitry 61 so that both state machines can be selectively driven to a reset state.

Referring again to the real time state machine circuitry 59, the DONE output thereof is driven low during the memory access but is otherwise maintained high. A comparator circuit 63 monitors the respective states of the real time state machine at 59 and the scaled time state machine at 61 via busses 65 and 67. When the states of the state machines are the same, the MATCH output of comparator circuit 63 is driven high but is otherwise maintained low.

The reset signal drives the state machines at 59 and 61 into the reset state so that the MATCH output of comparator circuit 63 is driven high. With the MATCH output of comparator circuit 63 high, DONE and GO are respectively qualified at AND gates 45 and 47. With DONE high, the ready signal RDY is taken high indicating that memory control circuitry 15 is available for a memory access.

Figure 6:
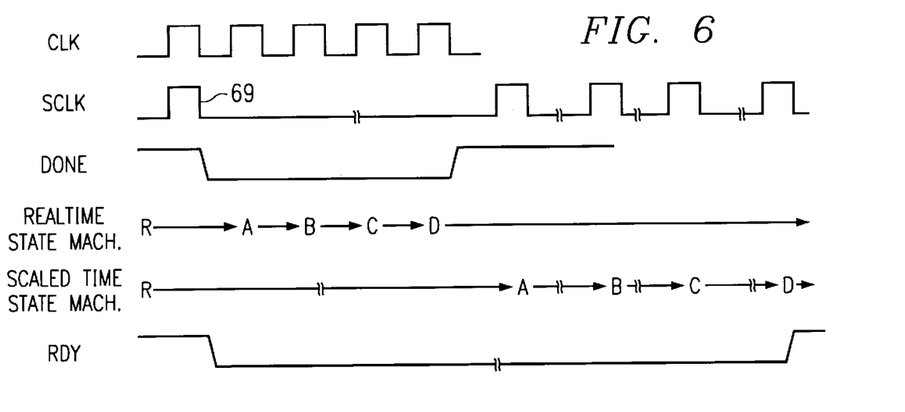
FIG. 6 is a timing diagram which illustrates the operation of the circuitry of FIG. 5.

Referring also now to FIG. 6, if the data processing circuitry 13, now being driven by the SCLK sequence, issues a GO command during clock pulse 69 of SCLK, then the START input of real time state machine circuitry 59 is activated. In response to activation of the START input, the DONE output is driven low to indicate that a memory access cycle is in progress. When the DONE output goes low, the ready signal RDY is driven low via AND gate 45. During the next clock pulse of CLK following activation of the START input, the real time state machine is driven from the reset state R into the beginning state A of the state sequence that controls memory accesses. Once the real time state machine assumes state A, the MATCH output of comparator circuitry 63 goes low, thereby inhibiting any further GO commands at AND gate 47, and disqualifying the DONE input of AND gate 45.

In the example of FIG. 6, the real time state machine advances from state A to state B, from state B to state C, and from state C to state D upon the occurrence of the next three successive pulses, respectively, of the normal system clock CLK. The memory access by memory interface 27 is controlled by this A to B to C to D state progression of the real time state machine. The real time state machine is in state D when the memory access is completed, and remains in state D until activation of either its START input or its reset input. If the START input is activated, then the real time state machine is driven from ending state D back into beginning state A for commencement of another memory access cycle. If the reset input is activated, then the real time state machine transitions from ending state D back into reset state R.

Once the memory cycle has been completed, the DONE output of real time state machine circuitry 59 is driven high. However, the ready signal RDY remains low because the scaled time state machine is still in reset state R while the real time state machine is in ending state D so that the MATCH output of comparator circuit 63 is low.

The START input of scaled time state machine circuitry 61 is also activated in response to the GO command from the data processing circuitry 13 during clock pulse 69 of SCLK, causing the scaled time state machine to transition from the reset state R into the beginning state A during the next SCLK pulse. Thereafter, the next three successive SCLK pulses respectively cause the scaled time state machine to transition from state A to state B, from state B to state C, and from state C to state D. When the scaled time state machine reaches state D, the MATCH output of comparator circuit 63 is driven high, thereby driving the ready signal RDY high via AND gate 45. As with the real time state machine, the scaled time state machine remains in state D until activation of either its START input or its reset input.

The memory access cycle illustrated in the FIG. 6 example requires four pulses of normal system clock CLK for completion, leaving the real time state machine in state D. The scaled time state machine reaches state D upon the occurrence of four SCLK pulses after the GO command. Thus, the ready signal RDY becomes active only when the data processing circuitry 13, which is being clocked by the SCLK sequence, reaches the machine state that it would have been in at the end of the memory access cycle had it been clocked by the normal system clock CLK.

It will be recognized that the data processing circuitry 13 can be stepped through a single clock cycle by starting with CLK EN low, thereafter taking CLK EN high for one CLK pulse, and then taking CLK EN low again upon completion of that CLK pulse. CLK can be fed back to the test interface 23 for use in achieving the stepping operation.

FIGS. 7–13 illustrate another data processing system which utilizes the present invention. Various features in FIGS. 7–13 correspond to features described above with respect to FIGS. 1–6, and are therefore designated with the corresponding reference numerals from FIGS. 1–6.

Figure 7:
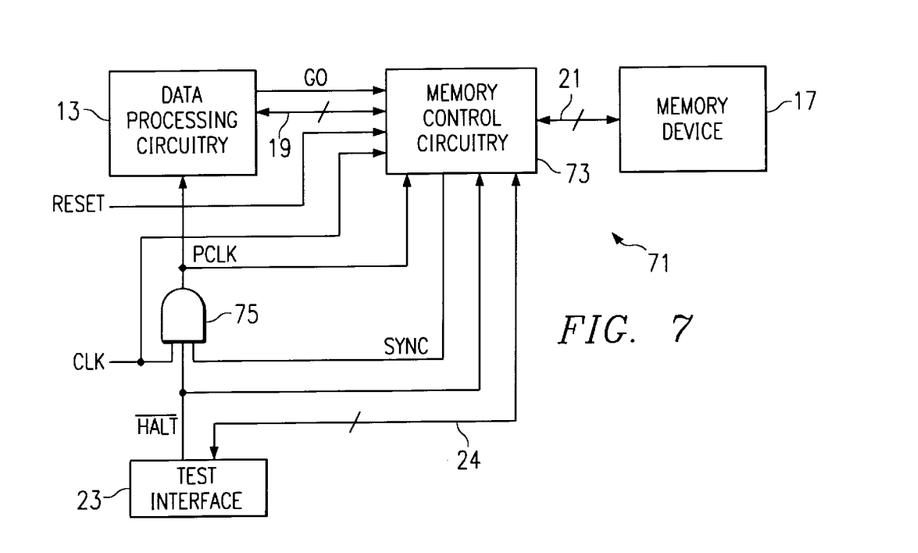
FIG. 7 is a block diagram of another data processing system including the present invention.

The data processing system of FIG. 7 includes a data processing apparatus 71 having data processing circuitry 13 and memory control circuitry 73. The memory control circuitry 73 functions as an interface between the data processing circuitry 13 and an external memory device 17. The data processing circuitry 13 provides a GO command to the memory control circuitry 73 in order to initiate a memory access. The address of the desired memory location is communicated from data processing circuitry 13 to memory control circuitry 15 via bus 19 which includes both address and data lines. The memory control circuitry 73 normally performs a memory access, or memory cycle in response to the GO command from the data processing circuitry 13. The memory access is accomplished via bus 21 connecting memory control circuitry 73 to the external memory device 17. The bus 21 includes address, data and control lines.

The data processing apparatus 71 is also provided with a test interface 23 which is externally controllable by, for example, a test controller. The test interface 23 is responsive to the external control to provide an active low halt signal which is used in the data processing apparatus 71. The halt signal is input to an AND gate 75 along with the normal system clock CLK and a SYNC signal provided by memory control circuitry 73. The output of AND gate 75, designated as PCLK, is used to clock the data processing circuitry 13. Thus, the clock signal PCLK of the data processing circuitry 13 can be disabled by driving low the halt signal from test interface 23. CLK, PCLK, and the halt signal are also input to the memory control circuitry 73 along with a reset signal. Bus 24 is connected between the memory control circuitry and the test interface.

Figure 8:
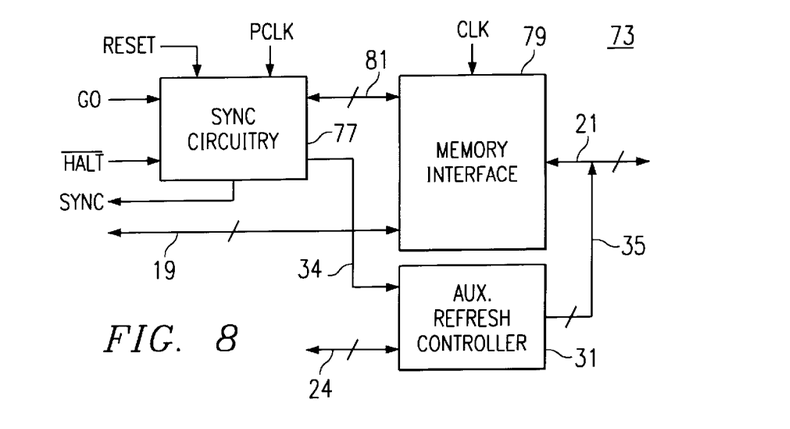
FIG. 8 is a block diagram of the memory control circuitry of FIG. 7.

FIG. 8 illustrates in greater detail the memory control circuitry 73 of FIG. 7. The memory control circuitry 73 includes a memory interface 79 which executes the memory accesses, synchronizing circuitry 77 which synchronizes the operation of the memory interface 79 with the data processing circuitry 13, and an auxiliary refresh controller 31 for providing refresh cycles to the external memory during the time that the memory interface 79 and the data processing circuitry 13 are being synchronized. The synchronizing circuitry 77 receives the halt input from test interface 23, the processor clock input PCLK, the reset input, and the GO command from the data processing circuitry 13. The synchronizing circuitry 77 also provides the SYNC signal to AND gate 75 of FIG. 7. The memory interface 79 receives the CLK input, is connected to data processing circuitry 13 via bus 19, and is connected to the external memory device 17 via bus 21. The memory interface 79 also communicates with the synchronizing circuitry 77 via a control signal bus 81. One control line 34 from synchronizing circuitry 77 is input to the auxiliary refresh controller 31. The auxiliary refresh controller 31 is connected to the external memory device 17 via busses 35 and 21, and to the test interface 23 via bus 24.

Figure 9:
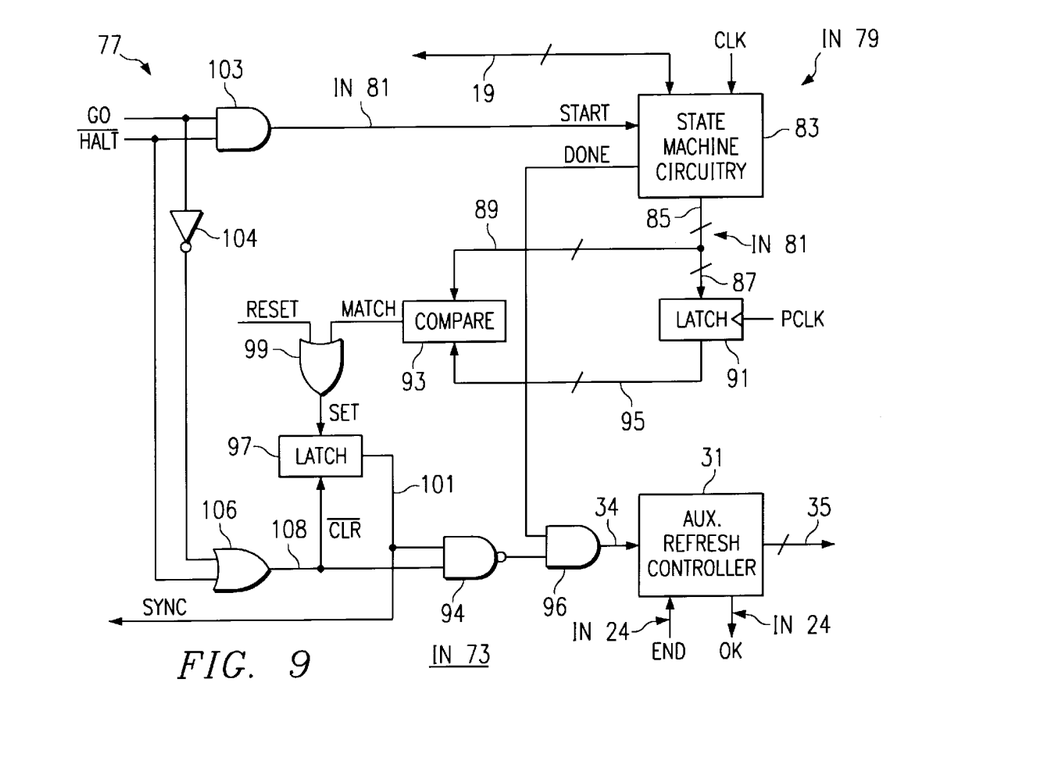
FIG. 9 is a detailed diagram of the synchronizing circuitry of FIG. 8.

Referring also now to FIG. 9, one exemplary embodiment of the synchronizing circuitry 77 is illustrated in further detail. In the embodiment of FIG. 9, memory interface 79 is provided with state machine circuitry 83 driven by the normal system CLK to control execution of the memory access performed by the memory interface 79. The state machine circuitry 83 includes a state machine that responds to activation of a START input by assuming a beginning state during the next CLK pulse, and thereafter progressing through a sequence of states with each successive CLK pulse until arriving at an ending state. This sequence of states controls the memory access operation of the memory interface 79.

The synchronizing circuitry 77 of FIG. 9 also includes a latch circuit 91 having a data input connected to state machine circuitry 83 via busses 85 and 87. Each state of the state machine at 83 has an identifying code associated therewith, and this code is applied to the input of latch circuit 91 via busses 85 and 87. The latch at 91 is clocked by PCLK, and the output of latch circuit is input via bus 95 to a comparator circuit 93. The other input of comparator circuit 93 receives, via bus 89, the identifying code associated with the present state of the state machine 83. The MATCH output of comparator circuit 93 is driven high when the codes input to the comparator circuit 93 are the same, and is otherwise maintained low.

The MATCH output of comparator circuit 93 is connected to one input of an OR 99 whose output drives the set input of a latch circuit 97. The reset line is connected to the other input of OR gate 99. The latch circuit 97 has a clear input connected to the output of an OR gate 106. The GO command line is connected to one input of OR gate 106 via inverter 104, and the other input of OR gate 106 is driven by the halt signal. The latch circuit 97 has an output 101 which defines the SYNC signal. The GO command line and the halt signal are input to an AND gate 103 whose output drives the START input of state machine circuitry 83.

Figure 10:
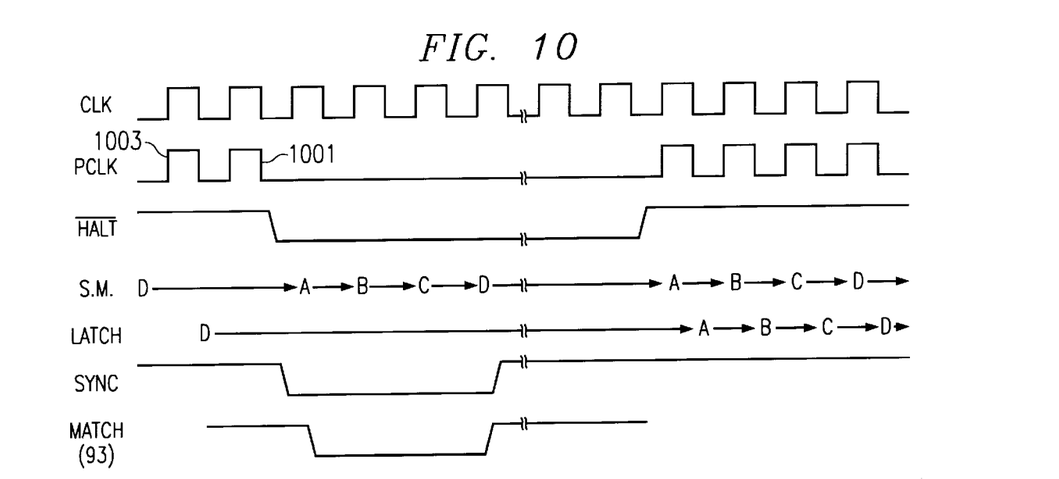
FIGS. 10–11 are timing diagrams which illustrate the operation of the circuitry of FIG. 9.

Referring also now to FIG. 10, if the data processing circuitry 13, which is being driven by PCLK, issues a GO command during clock pulse 1001 of PCLK, then the START input of state machine circuitry 83 is activated. In the example of FIG. 10, after issuance of the GO command during pulse 1001 of PCLK, the halt signal is taken low to disable PCLK (via AND gate 75 of FIG. 7) and thereby halt operation of the data processing circuitry 13. The halt signal also drives low the START input of state machine circuitry 83 via AND gate 103. The memory access has already been initiated by the GO command driving the START input high, but the state machine circuitry 83 detects, from the subsequent low level on the START input, that a processor halt has occurred before completion of the memory access initiated by the GO command.

At the beginning of the timing diagram of FIG. 10, the most recent memory access has been completed, and the state machine is still in ending state D. Thus, the identification code for state D is present on input bus 89 of comparator circuit 93, and this code is also latched through latch circuit 91 on the falling edge of PCLK pulse 1003 and again on the falling edge of pulse 1001. With the code for state D present at both inputs of comparator circuit 93, the MATCH output thereof is driven high. Of course, the SYNC signal is high from the reset signal applied to the set input of latch circuit 97 via OR gate 108, and remains high until the latch circuit 97 is cleared from OR gate 106. The OR gate 106 operates to clear the latch circuit 97 and drive SYNCH low only when the halt signal goes low while the GO command is active (i.e., when the halt signal goes low during a memory access). During the next pulse of CLK following activation of the START input, the state machine is driven from state D into the beginning state A of the state sequence that controls memory accesses. Once the state machine assumes state A, the MATCH output of comparator circuitry 93 is driven low.

In the example of FIG. 10, the state machine (indicated by S.M.) advances from state A to state B, from state B to state C, and from state C to state D upon the occurrence of the next three successive pulses, respectively, of CLK. The memory access by memory interface 79 is controlled by this A to B to C to D state progression of the state machine. For example, state A could cause a DRAM row cycle to occur, and states B through D could cause a DRAM column cycle to occur. The current memory access is completed during the CLK cycle in which the state machine assumes ending state D. The state machine normally remains in state D until the next memory access begins. When the state machine reaches state D in FIG. 10, the inputs to comparator circuitry 93 are the same, driving the MATCH output high. This sets latch circuit 97, thereby driving the SYNC signal high. With the SYNC signal high, the halt input to AND gate 75 of FIG. 7 is qualified to re-enable PCLK. However, at the time that SYNC goes high, the halt signal is still low, thereby keeping PCLK disabled.

When the halt signal goes high, PCLK is re-enabled so that the data processing circuitry 13 resumes operation. In addition, when the halt signal goes high, the START input of state machine circuitry 83 is activated again via AND gate 103 in FIG. 9, initiating a restart sequence. The state machine circuitry knows that a restart sequence is necessary because it earlier detected that the halt occurred after initiation of but before completion of a memory access cycle. During the first CLK pulse after such re-activation of its START input, the restart sequence begins with the state machine being driven into state A, and thereafter driven through states B, C, and D upon occurrence of the next three successive CLK pulses, respectively.

As shown in FIG. 10, PCLK is re-enabled at the proper point in time to synchronize the data processing circuitry 13 with the memory interface 79 as though the halt signal was never activated. Thus, normal cooperation between the data processing circuitry 13 and the memory interface 79 is resumed so that, for example, another desired memory access cycle can be initiated.

Figure 11:
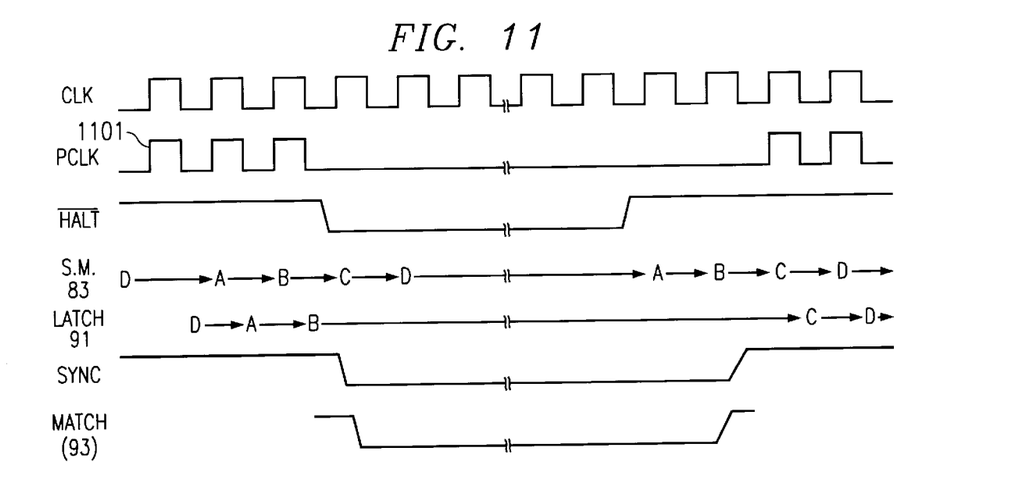

FIG. 11 provides another example of operation of the synchronizing circuitry 77 of FIG. 9. The timing diagram of FIG. 11 begins with the state machine in its ending state D, the previous memory access cycle having already been completed. During pulse 1101 of PCLK, the GO command is issued by the date processing circuitry 13. The memory access cycle therefore begins during the next pulse of the system clock CLK. More specifically, the state machine at 83 transitions from ending state D into beginning state A to begin the memory access cycle. The identification code for A is latched at 91 upon the next falling edge of PCLK. During the next successive pulse of CLK, the state machine transitions from A to B, and the identification code for B is latched at 91 upon the next falling edge of PCLK. Thereafter, the halt signal is driven active low to disable PCLK and reset the latch circuit 97, thereby driving the SYNC signal low. During the next successive CLK pulse, the state machine transitions from state B to state C, thereby causing a mismatch between the inputs of comparator circuit 93 and driving the MATCH output thereof low. During the next CLK pulse, the state machine transitions from C to D. The memory access cycle is completed during this cycle of CLK.

When the halt signal goes high again, the START input of state machine circuitry 83 is activated to begin the restart sequence. During the next pulse of CLK, the state machine at 83 transitions from D to A, thereby beginning the restart sequence. During the next successive CLK pulse, the state machine transitions into state B, causing the MATCH output of comparator 93 to go high. This sets the latch 97, thus driving the SYNC signal high. With both the SYNC signal and the halt signal high, CLK is qualified at AND gate 75, so that the PCLK signal of data processing circuitry 13 is re-enabled. As shown in FIG. 11, PCLK is re-enabled relative to the memory access cycle as if the data processing circuitry 13 had never been halted, permitting normal cooperation between the data processing circuitry 13 and the memory interface 79 to resume.

The auxiliary refresh controller 31 of FIG. 9 has input line 34 thereof driven by the output of an AND gate 96. One input of AND gate 96 is connected to DONE, and the other input of AND gate 96 is driven by NAND gate 94 whose inputs are connected to SYNC and the output of OR gate 106. The auxiliary refresh controller 31 is operative to provide refresh cycles whenever: (1) either the halt signal is low during a memory access, or SYNC is low; and (2) DONE is high.

It will be recognized that the data processing circuitry 13 can be stepped through a single clock cycle by starting with the halt signal of FIG. 7 low, thereafter taking the halt signal high until one PCLK pulse occurs, and then taking the halt signal low again upon completion of that PCLK pulse. PCLK can be fed back to the test interface 23 of FIG. 7 for use in achieving the stepping operation.

Considering the examples of FIGS. 9–11, because the originally-initiated memory access cycle was completed despite the occurrence of a processor halt during execution thereof, it may be desirable during the restart sequence to make some or all of the states of the state machine dummy states which are identical to the normal states except that they do not actually cause a memory access. For example, the dummy states may not cause certain strobe signals to the memory to go active. The dummy states have the same identification codes on bus 85 as the respective normal states. Depending upon the application environment in which the invention is being used, dummy states can be executed instead of the normal states for some or all of the states of the restart sequence.

Referring again to the aforementioned DRAM row and column cycle example, DRAMs are typically accessed in what is commonly known as PAGE MODE, wherein multiple column locations on the same DRAM row can be accessed without having to provide a new row address (and associated row cycle) before each new column cycle. An exemplary sequence is:

A B1 C1 D1 B2 C2 D2 B3 C3 D3 B4 C4 D4 . . .

In the above sequence, state A causes a row cycle for a selected row to occur, and states Bn through Dn (n=1,2,3 . . . ) cause a column cycle for column n of the selected row to occur. Thus, the above sequence accesses columns 1–4 of the selected row.

If the halt depicted in FIG. 11 happens, for example, during state B2 above (i.e., during state B of column cycle 2), then the access of column 2 would be completed after the halt, and the restart sequence and subsequent states would be as follows:

A B2 C2 D2 B3 C3 D3 B4 C4 D4 . . .

States B2, C2 and D2 of the restart sequence can be dummy states as described above, because the access cycle for column 2 has already been completed. However, state A would preferably be a normal state (i.e. not a dummy state), so that the PAGE MODE access can be continued with further column cycles after dummy state D2 is executed.

In the following sequence, state A(new) causes a row cycle to occur for a different row than state A:

A B1 C1 D1 B2 C2 D2 A(new) B1 C1 D1 . . .

If the halt depicted in FIG. 11 happens, for example, during state B2, then the restart sequence and subsequent states would be as follows:

A B2 C2 D2 A(new) B1 C1 D1 . . .

In this example, states A, B2, C2 and D2 could be dummy states because the memory cycle for column 2 of the row selected by state A has already been completed. Alternatively, state A could be a normal state, with states B2, C2 and D2 being dummy states.

Considering again the data processing systems illustrated in FIGS. 1 and 7, if the external memory device 17 cannot respond to the data processing apparatus within the normal memory cycle of the memory control circuitry, then the memory device can insert wait states into the memory control circuitry. Each wait state causes the state machine of the memory interface to stall in its current state for as many clock cycles as the wait state is active. In order to restart the data processing circuitry in proper synchronization relative to the memory interface, the synchronizing circuitry must account for these wait states.

Figure 12:
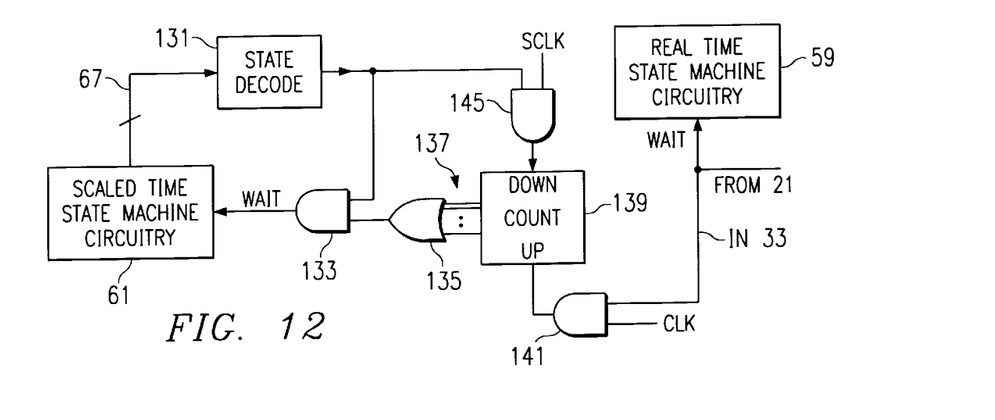
FIG. 12 illustrates additional circuitry which can be combined with the circuitry of FIG. 5 to produce synchronizing circuitry capable of accommodating wait states.

FIG. 12 illustrates exemplary circuitry which can be included in the synchronizing circuitry 29 of FIG. 5 to accommodate the aforementioned use of wait states. It will be clear from FIG. 12 and the following description thereof, that the circuitry of FIG. 12 can be connected as indicated into the synchronizing circuitry 29 of FIG. 5.

FIG. 12 illustrates an up/down counter circuit 139 which, by operation of AND gate 141, counts up once for each CLK cycle during which a wait state is active. The counter circuit 139 counts down in response to SCLK when SCLK is qualified at AND gate 145 by state decode logic 131. The count output 137 of counter circuit 139 remains unchanged if the UP and DOWN inputs thereof are pulsed simultaneously. State decode logic 131 decodes the state of the scaled time state machine at 61 and, if that state can be executed multiple times by wait states, the output of state decode logic 131 drives one input of AND gate 133 high, and also drives one input of AND gate 145 high. If the count output 137 is non-zero, then the other input of AND gate 133 is also driven high via OR gate 135, causing a wait state to be applied to the scaled time machine via AND gate 133. The current state of the scaled time state machine is then executed for as long as it takes for SCLK, via AND gate 145, to decrement the count output 137 to zero.

Figure 13:
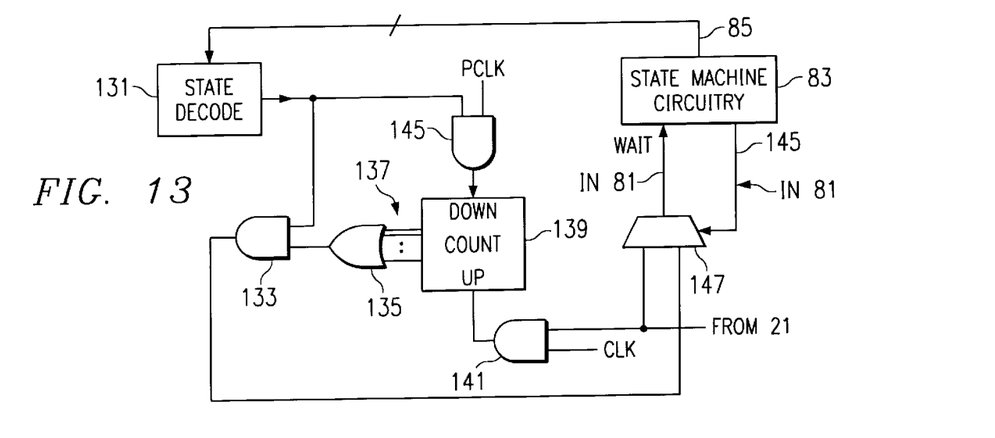
FIG. 13 illustrates additional circuitry which can be combined with the circuitry of FIG. 9 to produce synchronizing circuitry capable of accommodating wait states.

FIG. 13 illustrates exemplary circuitry which can be included in the synchronizing circuitry 77 of FIG. 9 to accommodate the aforementioned use of wait states. It will be clear from FIG. 13 and the following description thereof, that the circuitry of FIG. 13 can be connected as indicated into the synchronizing circuitry 77 of FIG. 9.

FIG. 13 operates similarly to FIG. 12, and analogous components are numbered as in FIG. 12. In FIG. 13, the output of AND gate 133 is input to a multiplexer 147 along with the wait state input from bus 21. The multiplexer 147 connects one of its inputs to state machine circuitry 83 in response to a control signal output from state machine circuitry 83 on line 145. If the state machine circuitry 83 is executing a normal state, then the control signal on line 145 selects the wait state signal from bus 21. If the state machine circuitry 83 is executing a dummy state, then the control signal on line 145 selects the output of AND gate 133. In FIG. 13, the counter circuit 139 counts down in response to PCLK (see FIGS. 7–11) when PCLK is qualified at AND gate 145 by state decode logic 131.

Although the invention is described above with respect to a memory as a peripheral device, it is recognized that the invention can be used with any type of peripheral device whose access cycle is not to be interrupted by a processor halt.

Although exemplary embodiments of the present invention are described above, this description does not limit the scope of the invention, which can be practiced in a variety of embodiments.

What is claimed is:

1. A data processing apparatus, comprising:

control circuitry connectable to a peripheral device for controlling a data transfer operation involving the peripheral device;

data processing circuitry connected to said control circuitry for directing said control circuitry to commence the data transfer operation and for receiving from said control circuitry an indication that the data transfer operation has been completed; and said control circuitry including synchronizing circuitry for withholding the indication of completion from the data processing circuitry for a period of time after the data transfer operation has been completed.

2. The apparatus of claim 1, wherein said control circuitry includes memory control circuitry for performing a memory access of a memory device.

3. The apparatus of claim 2, including a memory refresh circuit for providing memory refresh cycles to the memory device between completion of the memory access and issuance of the completion indication.

4. The apparatus of claim 1, wherein said control circuitry controls the data transfer operation in response to passage of real time, and wherein, during the data transfer operation, said data processing circuitry executes in response to passage of scaled time which is expanded relative to real time so that said data processing circuitry performs fewer operations during the data transfer operation than it would perform if it were executing in response to passage of real time.

5. The apparatus of claim 4, wherein said synchronizing circuitry includes counter circuitry having a counter output, said counter circuitry being operative to increment said counter output in response to passage of real time and to decrement said counter output in response to passage of scaled time.

6. The apparatus of claim 4, wherein said synchronizing circuitry includes a first state machine circuit operable in scaled time for measuring passage of scaled time, and wherein said control circuitry includes a second state machine circuit operable in real time for controlling execution of the data transfer operation.

7. The apparatus of claim 6, wherein said first and second state machine circuits include respective state machines which are identical to one another.

8. The apparatus of claim 7, wherein said synchronizing circuitry includes a comparator circuit which compares the respective states of said state machines.

9. The apparatus of claim 6, wherein said first state machine circuit is driven by a first clock which defines scaled time, and wherein said second state machine circuit is driven by a second clock which defines real time, said second clock being operative at a higher clock rate than said first clock.

10. The apparatus of claim 4, including circuitry for selectively causing said data processing circuitry to operate in response to passage of one of scaled time and real time.

11. A data processing apparatus, comprising:

memory control circuitry connectable to a memory device and driven by a first dock for performing a memory access of the memory device;

data processing circuitry connected to said memory control circuitry and responsive to a second clock for directing said memory control circuitry to commence a memory access and for receiving from said memory control circuitry an indication that the memory access has been completed, said second clock having a lower clock rate than said first clock during the memory access;

said memory control circuitry including synchronizing circuitry for withholding said completion indication from said data processing circuitry until a number of cycles of said second clock which have occurred since commencement of the memory access equals a number of cycles of said first clock required to perform the memory access.

12. The apparatus of claim 11, wherein said synchronizing circuitry includes counter circuitry having a counter output, said counter circuitry being driven by said first clock to increment said counter output and to thereby record operation of said first clock, and said counter circuitry being driven by said second clock to decrement said counter output and to thereby record operation of said second clock.

13. The apparatus of claim 11, wherein said second clock is an emulation step clock for stepping said data processing circuitry through a desired sequence of machine states.

14. The apparatus of claim 13, wherein clock cycles of said step clock occur irregularly relative to said first clock.

15. A data processing apparatus, comprising:
memory control circuitry connectable to a memory device for performing a memory access of the memory device by progressing through a sequence of machine states;
data processing circuitry connected to said memory control circuitry for instructing said memory control circuitry to perform a memory access and for thereafter processing data by progressing through a sequence of machine states;
emulation circuitry for selectively causing said data processing circuitry to halt its operations during execution of a memory access without halting execution of the memory access; and
said memory control circuitry including synchronizing circuitry for permitting said data processing circuitry to advance through its machine state sequence, while maintaining said memory control circuitry in a known machine state, until said data processing circuitry is in the machine state that it would have been in upon completion of the memory access but for said halting of said data processing circuitry operation.

16. A method of executing a data transfer operation requested by a data processing circuit, comprising the steps of:
receiving from the data processing circuit a request to execute a data transfer operation involving a peripheral device external to the data processing circuit;
commencing and completing the requested data transfer operation; and
waiting for a period of time after completion of the data transfer operation, and thereafter providing to the data processing circuit an indication that the data transfer operation has been completed.

17. The method of claim 16, wherein the data transfer operation is commenced and completed in response to passage of real time, and further including the step of, during the data transfer operation, using the data processing circuit to execute data processing operations in response to passage of scaled time which is expanded relative to real time so that the data processing circuit performs fewer operations during the data transfer operation than it would perform if it were executing in response to passage of real time.

18. The method of claim 17, including the steps of measuring passage of real time during the data transfer operation, measuring passage of scaled time after the data transfer operation, and correlating the measured passage of scaled time with the measured passage of real time.

19. A data processing apparatus, comprising:
memory control circuitry connectable to a memory device for performing a memory access of the memory device by progressing through a sequence of machine states;
data processing circuitry connected to said memory control circuitry for instructing said memory control circuitry to perform a memory access and for thereafter processing data by progressing through a sequence of machine states;
emulation circuitry for selectively causing said data processing circuitry to halt its operations during execution of a memory access without halting execution of the memory access; and
said memory control circuitry including synchronizing circuitry for causing said memory control circuitry to advance through its machine state sequence, while maintaining said data processing circuitry in a known machine state, until said memory control circuitry is in the machine state that it was in when said halting of said data processing circuitry operation occurred.

20. The apparatus of claim 19, wherein said synchronizing circuitry includes a latch circuit for selectively latching information indicative of the current machine state of said memory control circuitry.

21. The apparatus of claim 20, wherein said synchronizing circuitry includes circuitry responsive to said latched information for determining whether the machine state of said memory control circuitry at a given point in time is the same as the machine state indicated by said latched information.

22. The apparatus of claim 19, wherein said synchronizing circuitry includes circuitry for accommodating wait states applied to said memory control circuitry by an external source during memory accesses.

23. The apparatus of claim 22, wherein said circuitry for accommodating wait states includes a circuit which records a length of time for which wait states are active during execution of the memory access after said data processing circuitry operations are halted and also records said length of time after resumption of said data processing circuitry operations is initiated.

24. A data processing apparatus, comprising:
memory control circuitry connectable to a memory device and driven by a first clock for commencing and completing, over a period of time, a memory access of the memory device;
data processing circuitry connected to said memory control circuitry and responsive to a second clock for directing said memory control circuitry to commence a memory access and for receiving from said memory control circuitry an indication that the memory access has been completed, said second clock having a lower clock rate than said first clock during the memory access;
said memory control circuitry including synchronizing circuitry for withholding said completion indication from said data processing circuitry only until a number of cycles of said second clock which have occurred since commencement of the memory access equals a number of cycles of said first clock which occurred during said period of time.

25. The apparatus of claim 24, wherein said synchronizing circuitry includes counter circuitry having a counter output, said counter circuitry being driven by said first clock to increment said counter output and to thereby record operation of said first clock, and said counter circuitry being driven by said second clock to decrement said counter output and to thereby record operation of said second clock.

26. The apparatus of claim 24, wherein said second clock is an emulation step clock for stepping said data processing circuitry through a desired sequence of machine states.

27. The apparatus of claim 26, wherein clock cycles of said step clock occur irregularly relative to said first clock.

* * * * *